(12) United States Patent
Kakita et al.

(10) Patent No.: US 9,747,664 B2
(45) Date of Patent: Aug. 29, 2017

(54) IMAGE PROCESSING APPARATUS

(71) Applicant: FUJITSU TEN LIMITED, Kobe-shi, Hyogo (JP)

(72) Inventors: Naoshi Kakita, Kobe (JP); Atsushi Mino, Kobe (JP); Takayuki Ozasa, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 146 days.

(21) Appl. No.: 14/817,807

(22) Filed: Aug. 4, 2015

(65) Prior Publication Data

US 2016/0063333 A1    Mar. 3, 2016

(30) Foreign Application Priority Data

Aug. 26, 2014 (JP) ................................. 2014-171245

(51) Int. Cl.
  *G06K 9/00* (2006.01)
  *G06T 3/40* (2006.01)
  *G06T 5/00* (2006.01)

(52) U.S. Cl.
  CPC ............... *G06T 3/40* (2013.01); *G06T 5/006* (2013.01); *G06K 9/00812* (2013.01); *G06T 2207/30264* (2013.01)

(58) Field of Classification Search
  CPC . G06T 5/006; G06T 3/40; G06T 2207/30264; G06K 9/00812
  See application file for complete search history.

(56) References Cited

U.S. PATENT DOCUMENTS

| 5,825,415 A * | 10/1998 | Kaneda | H04N 5/23248 |
| | | | 348/208.6 |
| 2009/0128686 A1* | 5/2009 | Yamashita | B60R 1/00 |
| | | | 348/369 |
| 2012/0293672 A1* | 11/2012 | Nonaka | G03B 5/00 |
| | | | 348/208.5 |
| 2013/0094002 A1* | 4/2013 | Chung | G03B 21/147 |
| | | | 353/69 |
| 2013/0286172 A1* | 10/2013 | Sasaki | A61B 1/00009 |
| | | | 348/65 |

(Continued)

FOREIGN PATENT DOCUMENTS

JP    2010-033108 A    2/2010

*Primary Examiner* — Stephen R Koziol
*Assistant Examiner* — Shaghayegh Azima
(74) *Attorney, Agent, or Firm* — Oliff PLC

(57) ABSTRACT

An image processing apparatus includes: an image processor which: receives a captured-image from an image acquisition part acquiring the captured-image from a camera that captures an image of a vicinity of a vehicle; project data of the captured-image onto a virtual projection plane provided in the vicinity of the vehicle; and correct deformation of the captured-image caused by projection of the captured-image onto the virtual projection plane. In a case of presence of a command indicative of enlarging a portion of the captured-image, the image processor corrects the deformation of the captured-image by using a greater correction amount than that used in a case of absence of the input of the command indicative of enlarging the portion of the captured-image. Accordingly, in a case where a portion of an image of a vicinity of a vehicle is enlarged, deterioration of image quality can be suppressed as much as possible.

5 Claims, 12 Drawing Sheets

(56) References Cited

U.S. PATENT DOCUMENTS

| | | | |
|---|---|---|---|
| 2014/0002612 A1* | 1/2014 | Morioka | G03B 35/08 348/46 |
| 2014/0125774 A1* | 5/2014 | Lee | G06T 3/4038 348/47 |
| 2014/0247358 A1* | 9/2014 | Takeda | G06T 5/006 348/148 |
| 2014/0347450 A1* | 11/2014 | Han | B60R 1/00 348/48 |
| 2016/0027158 A1* | 1/2016 | An | G06T 7/80 348/148 |
| 2016/0063333 A1* | 3/2016 | Kakita | G06T 3/40 382/104 |
| 2016/0176344 A1* | 6/2016 | Wang | H04N 5/23229 348/36 |

* cited by examiner

IMAGE PROCESSING APPARATUS

BACKGROUND OF THE INVENTION

Field of the Invention

The invention relates to a technology for image processing.

Description of the Background Art

A conventionally-known image display system generates images showing a vicinity of a vehicle, such as a car, and displays the generated images on a display in the vehicle. Users (mainly a driver) can recognize situations of the vicinity of the vehicle substantially on a real-time basis by using such an image display system.

An image display system is also known that generates an image showing the vicinity of the vehicle viewed from an arbitrarily-set virtual viewpoint, such as a point above the vehicle, using images acquired by capturing images of the vicinity of the vehicle and that displays the generated image. The image showing the vicinity of the vehicle viewed from the virtual viewpoint is generated by using data of a virtual projection plane acquired by projecting data of captured images onto the virtual projection plane corresponding to the vicinity of the vehicle. A shape of such a projection plane is generally a horizontal plane (road surface) in a horizontal direction.

However, in a case where the shape of the projection plane is the horizontal plane (road surface), the further an object exists from the vehicle, the further the object is projected on the projection plane. In a case of a 3D object, for example, a height of the 3D object is displayed higher than an actual height of the 3D object from the road surface. In other words, the 3D object is displayed, being deformed and seeming stretched longitudinally as compared to the actual 3D object. Such a phenomenon is specifically obvious in left, right, upper and lower end portions of the image.

In order to improve strangeness of the displayed image, a method is also well-known in which image data is projected, using a bent projection plane of which inclination becomes greater as a portion is further away from a position of the vehicle on the projection plane. In this case, a position onto which an image of a 3D object existing distant from the vehicle is projected is closer than a position onto which the image of the 3D object is projected in a case of projection onto a horizontal plane. Therefore, an image is generated, suppressing deformation caused by the longitudinal extension.

If such a projection plane is used, an upper center portion of the image is shrunk to suppress the deformation by the longitudinal extension, mainly, of the portion located further from the vehicle. Therefore, the image is not displayed in an upper center portion of a screen. In order to actually display the image on the display, an area other than the undisplayed area is extracted from the image and the extracted portion is displayed.

The greater an angle of the projection plane is, the greater a correction amount for suppressing the deformation by longitudinal extension is. Thus, the 3D object can be displayed with less strangeness. While, the greater the correction amount is, the greater an area in the upper center portion of the image is shrunk and the less displayable area is. In other words, extracted area is reduced. Thus, an area showing the vicinity of the vehicle is reduced and thus it is difficult to see the vicinity of the vehicle sufficiently. Therefore, it is necessary to strike a balance between the correction amount for suppressing the deformation by longitudinal extension and the displayable area. The correction amount for suppressing the deformation by longitudinal extension cannot be increased without consideration.

As described above, since the correction amount for suppressing the deformation by longitudinal extension cannot be increased enough, the conventional technology cannot improve the deformation by longitudinal extension sufficiently. In a case where a portion of such an image is enlarged and displayed, the image of which quality is insufficiently improved is enlarged. Therefore, the image quality is further deteriorated.

SUMMARY OF THE INVENTION

According to one aspect of the invention, an image processing apparatus that processes an image includes an image processor configured to: receive a captured image from an image acquisition part that acquires the captured image from a camera that captures an image of a vicinity of a vehicle; project data of the captured image onto a virtual projection plane provided in the vicinity of the vehicle; and correct deformation of the captured image caused by projection of the captured image onto the virtual projection plane. In a case of presence of input of a command indicative of enlarging a portion of the captured image, the image processor corrects the deformation of the captured image by using a greater correction amount than a correction amount that is used in a case of absence of the input of the command indicative of enlarging the portion of the captured image.

Accordingly, since the image processor corrects the deformation of the captured image projected onto the virtual projection plane, it is possible to suppress deterioration of quality of the captured image caused when the captured image is projected onto the virtual projection plane. Moreover, in a case of presence of the input of the command indicative of enlarging the portion of the captured image, the image processor uses a greater correction amount than a correction amount that is used in a case of absence of the input of the command indicative of enlarging the portion of the captured image. Therefore, it is possible to enlarge the portion of the captured image of which deterioration of the quality is suppressed.

According to another aspect of the invention, the image processor corrects the deformation of the captured image by use of a substantially maximum correction amount as long as an undisplayed area does not overlap an enlargement region that is enlarged by the input of the command indicative of enlarging the portion of the captured image, the undisplayed area being caused by correction of the deformation.

Accordingly, it is possible to suppress the deterioration of the quality of the projected image substantially maximally without an overlap of the undisplayed area caused by correction of the deformation with a displayed area.

Therefore, an object of the invention is to provide a technique that suppresses deterioration of image quality when a portion of an image of a vicinity of a vehicle is enlarged.

These and other objects, features, aspects and advantages of the invention will become more apparent from the following detailed description of the invention when taken in conjunction with the accompanying drawings.

DESCRIPTION OF THE EMBODIMENTS

An embodiment of the invention is hereinafter described with reference to the drawings.

<1. System Configuration>

Figure 1:
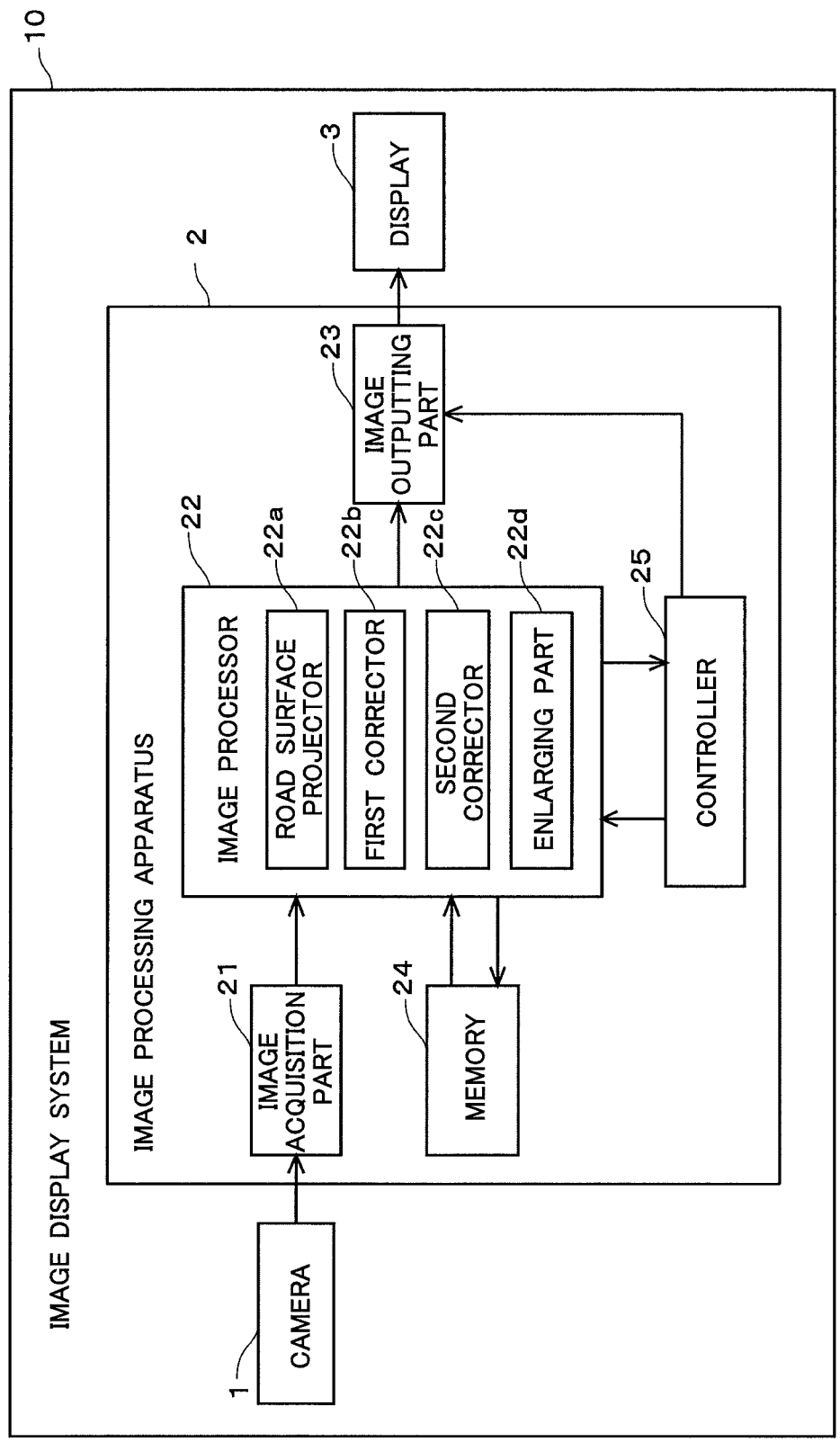
FIG. 1 illustrates a block diagram of an image display system.

A configuration of an image display system 10 in this embodiment is described. FIG. 1 illustrates a schematic block diagram of the configuration of the image display system 10. The image display system 10 includes a camera 1, an image processing apparatus 2 and a display 3. The image display system 10 is installed on a vehicle, such as a car, and includes a function of capturing images of a vicinity of the vehicle and displaying images generated through a predetermined process of the captured images. The vehicle on which the image display system 10 is installed is hereinafter referred to as "host vehicle."

The camera 1 acquires the captured images by capturing images of the vicinity of the host vehicle. The camera 1 includes a lens and an image sensor, and electronically acquires the captured images. The camera 1 acquires the captured images repeatedly in a predetermined time cycle (e.g. 1/30 sec.). For example, the camera 1 is provided to a rear portion of the host vehicle and is used as a rear camera that captures images of an area behind the host vehicle. However, the camera 1 is not limited to the rear camera. The camera 1 may be a camera that captures images of an area in a different direction or plural cameras may be used.

In a case where the camera 1 is used as the rear camera, the camera 1 is provided on a rear door on a rear end of the host vehicle. An optical axis of the camera 1 is directed backwards in a front-back direction. Therefore, the camera 1 captures images of the area behind the host vehicle and acquires the captured image showing situations behind the host vehicle. Moreover, for example, a fish lens is used for the camera 1. In a case where the fish lens is used for the camera 1, the camera 1 has an angle of view of 180 degrees or more. In other words, the camera 1 captures images of the area of 180 degrees or more in a left-right direction behind the host vehicle.

The image processing apparatus 2 performs a predetermined process of the captured images captured by the camera 1 and then outputs the processed captured images to the display 3. The image processing apparatus 2 includes an image acquisition part 21, an image processor 22, an image outputting part 23, a memory 24 and a controller 25.

The image acquisition part 21 acquires, from the camera 1, the analog or digital captured images in a predetermined time cycle (e.g. 1/30 sec.) temporally-continuously. In a case where the image acquisition part 21 acquires the analog captured images, the image acquisition part 21 converts the acquired analog captured images into digital captured images (A/D conversion). Each of the captured images processed by the image acquisition part 21 is one frame of an image signal.

The image processor 22 performs a predetermined process of the captured images acquired by the image acquisition part 21. The image processor 22 uses an ASIC, an FPGA or another hardware circuit that can execute the predetermined process. The image processor 22 includes a road surface projector 22a, a first corrector 22b and a second corrector 22c and an enlarging part 22d.

The road surface projector 22a includes a function of projecting the captured images acquired by the image acquisition part 21 onto a horizontal plane. This embodiment describes a configuration for projection onto a road surface (world coordinates) as a horizontal plane. In the case where the camera 1 is used as the rear camera, the camera 1 is installed in a relatively low position of the vehicle. In this case, since a viewpoint of the camera 1 is low, the image display system 10 changes the low viewpoint to an upper viewpoint to generate easy-to-see images for a user. Therefore, when changing the viewpoint, the road surface projector 22a projects the captured images onto the road surface.

The first corrector 22b corrects distortion. Generally, the captured images captured by the camera 1 include the distortion as image deformation caused by a shape of the lens of the camera 1. Especially, in a case where a fish lens or the like is used, as described in this embodiment, the deformation is obvious. Therefore, the first corrector 22b corrects image data of the captured image projected onto the road surface to suppress the distortion.

The second corrector 22c corrects image deformation caused by the projection of the captured image onto the road surface. When the captured image is projected onto the road surface, 3D objects, such as vehicles and buildings, in the captured image are vertically enlarged (longitudinally extended) unnaturally. The vertical enlargement (longitudinal extension) of 3D objects existing away from the camera 1 is especially obvious. Therefore, the second corrector 22c performs correction that suppresses the deformation caused by longitudinal extension of the image data of the captured image of which the distortion has been corrected. As a method for the correction, a new projection plane that is partially bent is used.

Moreover, the second corrector 22c changes correction amounts, depending on presence or absence of input of a command indicative of partial enlargement of the captured image. Moreover, in a case where the captured image is enlarged, the second corrector 22c changes the correction amount, depending on a portion and/or a range of the captured image to be enlarged. The correction amount is changed by changing a degree of bend of the new projection plane. Details of a process performed by the second corrector 22c will be described later.

The enlarging part 22d includes a function of partially enlarging the captured image. In a case of absence of a user operation indicative of enlarging a portion of the captured image, the enlarging part 22d extracts and enlarges a substantially largest displayable range of the captured image. On the other hand, in a case of presence of a user operation indicative of enlarging a portion of the captured image, the enlarging part 22d enlarges the specified portion of the captured image. Concretely, the enlarging part 22d identifies the portion and a range specified to be enlarged by the user operation and waits for correction by the second corrector 22c. The enlarging part 22d performs an enlargement process of the captured image corrected by the second corrector 22c.

The image outputting part 23 converts the captured image processed by the image processor 22 into an image signal in a predetermined format, such as NTSC, and outputs the image signal to the display 3. Thus, the captured image, for example, viewed from the upper viewpoint is displayed on the display 3.

The memory 24 stores correction values that are used by the second corrector 22c. The second corrector 22c performs, as described above, the correction that suppresses the deformation caused by longitudinal extension by bending the projection plane. The memory 24 stores degrees of the bend of the projection plane as the correction values. The correction values are: a first correction value that is used in a case where the enlargement process based on a user command is not performed; and a second correction value that is used in a case where the enlargement process based on a user command is performed. The first correction value is predetermined. The second correction value is associated with a portion or a range to be enlarged.

The memory 24 is a non-volatile semiconductor memory from/to which data can be electrically read and written and on which data is not erased even after power is off. For example, an electrically erasable programmable read-only memory (EEPROM) or a flash memory is used for the memory 24. However, another storage device may be used for the memory 24. The memory 24 may be configured by a hard disk drive including a magnetic disk.

The controller 25 is a microcomputer including a CPU, a RAM, a ROM or the like. The controller 25 controls each part of the image processing apparatus 2 including the image processor 22. Functions of the controller 25 are implemented by software. In other words, the functions of the controller 25 are implemented by arithmetic processes (execution of programs) of the CPU based on the programs stored in the ROM.

The display 3 is provided to a position where the user (mainly driver) can see the display 3 in the cabin. The display 3 displays the captured images captured by the camera 1 and shows various information to the user. Moreover, the display 3 may include a navigation function that provides a route guidance leading to a destination. The display 3 may include a touch panel function that receives user operations.

<2. System Process>

Figure 2:
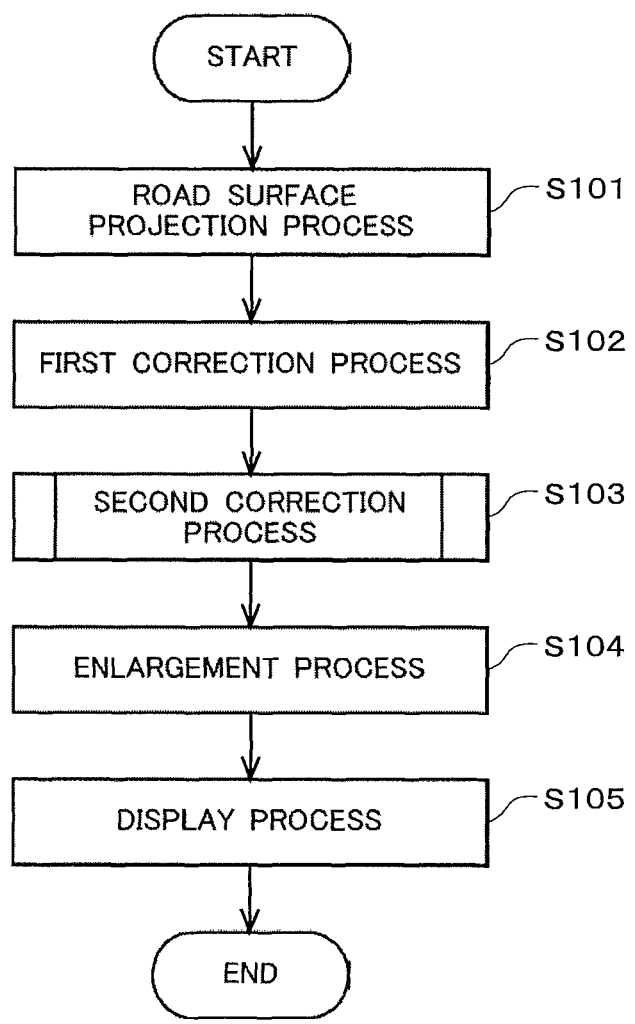
FIG. 2 is a flowchart of a process performed by the image display system.

Next described is a process performed by the image display system 10. FIG. 2 is a flowchart of the process performed by the image display system 10.

In the image display system 10, in a case where a predetermined condition is satisfied, the image acquisition part 21 acquires the captured image captured by the camera 1 and outputs the acquired captured image to the image processor 22. Then, the image processor 22 performs a road surface projection process (a step S101). Some among the predetermined conditions are a start command input by the user, a viewpoint change command input by the user and gear change to R (reverse) of the host vehicle.

Figure 3:
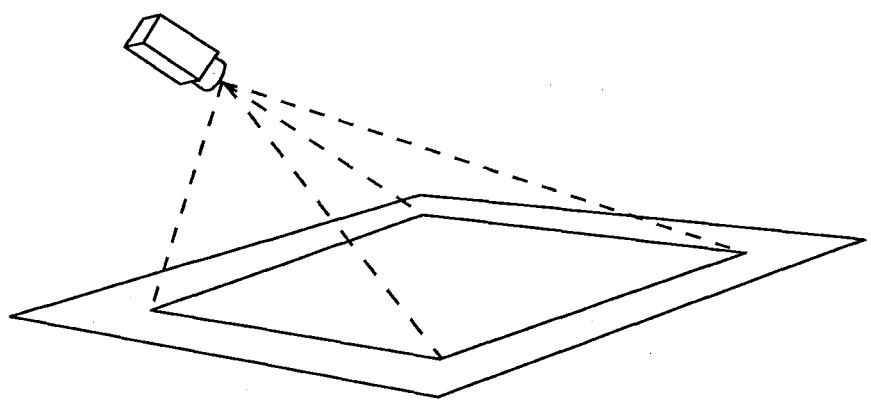
FIG. 3 illustrates an example of projection of image data.

Concretely, the road surface projector 22a projects data (values of individual pixels) included in the captured image captured by the camera 1, onto a projection plane in a virtual 3D space. The road surface projector 22a projects the data of the captured image onto the projection plane virtually provided in the vicinity of the host vehicle. In other words, the road surface projector 22a projects the data of the captured image onto the virtual projection plane provided in the vicinity of the host vehicle. The projection plane used in this embodiment is a plane corresponding to the horizontal plane (road surface). FIG. 3 is a pattern diagram of an example showing that image data of the captured image is projected onto the road surface. As shown in FIG. 3, the image data of the captured image is projected onto the road surface such that the original captured image corresponds to an image viewed from a virtual viewpoint.

Figure 4A:
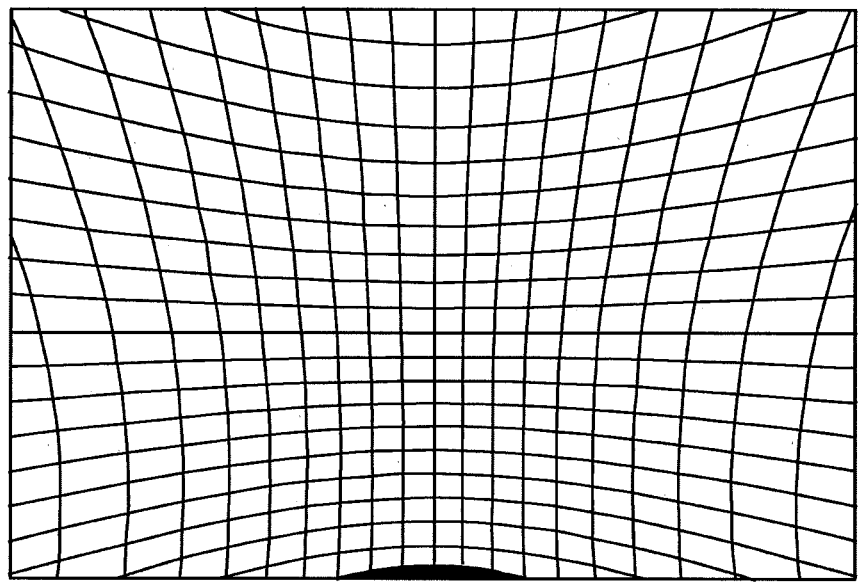
FIG. 4A is an image drawing a projection plane.

With reference back to FIG. 2, the image processor 22 performs a first correction process (a step S102). In the first correction process, the first corrector 22b corrects distortion. The first correction process is explained with reference to FIG. 4A and FIG. 4B. FIG. 4A is an image drawing showing corrected distortion of an image projected onto the road surface. A crosshatch pattern is used for FIG. 4A for easy understanding of the correction.

Figure 4B:
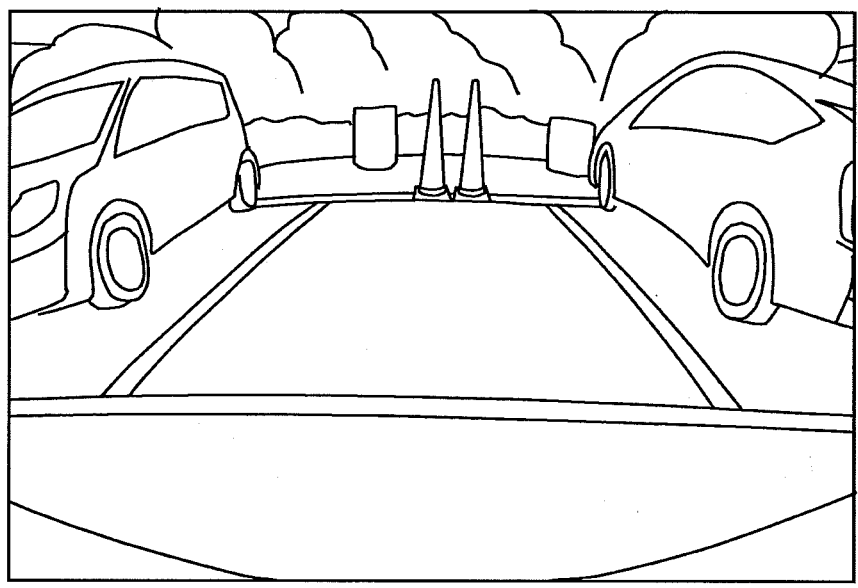
FIG. 4B illustrates an example of a displayed image.

As shown in FIG. 4A, deformation of the image is obvious in an outer end portion around the image so that a greater correction amount is set for the outer end portion of the image. FIG. 4B illustrates an example of the captured image after the first correction process. A well-known method, such as coordinate transformation, may be used as a method for the first correction process. The image data of the captured image projected onto the road surface is acquired through the first correction process.

With reference back to FIG. 2, the image processor 22 performs a second correction process (a step S103). In the second correction process, the second corrector 22c suppresses deformation caused by longitudinal extension of images of 3D objects, as described above. Generally, the further an object exists from the camera 1, the greater a vertical extension (longitudinal elongation) amount of the object projected onto the road surface is. The object existing further from the camera 1 is displayed in an upper portion of a screen. Therefore, the second correction process uses a greater correction amount for image data to be displayed on the upper portion of the screen, among image data projected onto the road surface, to suppress the longitudinal elongation.

Figure 5:
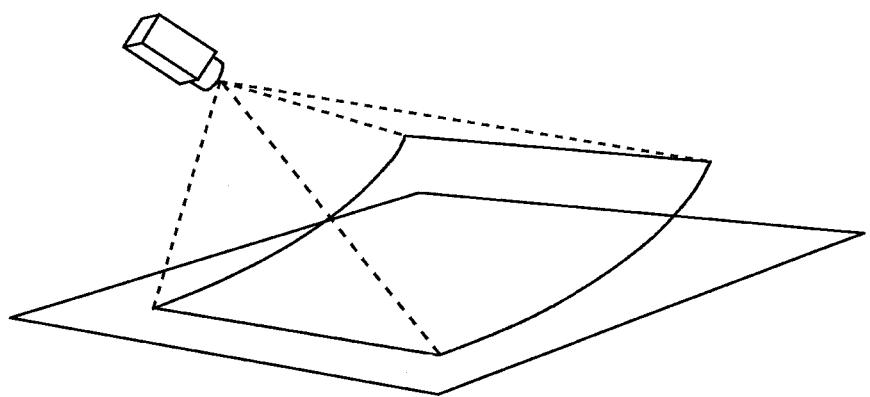
FIG. 5 illustrates an example of projection of image data.

Concretely, among the image data projected onto the road surface, the image data to be displayed on the upper portion of the screen is bent toward the virtual viewpoint (toward the host vehicle). In other words, the image data to be displayed on the upper portion of the screen is lifted toward the virtual viewpoint (toward the host vehicle). As described above, a new projection plane is generated by pulling the upper portion of the projection plane projected onto the road surface. This is explained also with reference to FIG. 5. As shown in FIG. 5, the new projection plane is a projection plane, projected onto the road surface, of which a portion corresponding to the upper portion of the screen is lifted and bent.

Figure 6:
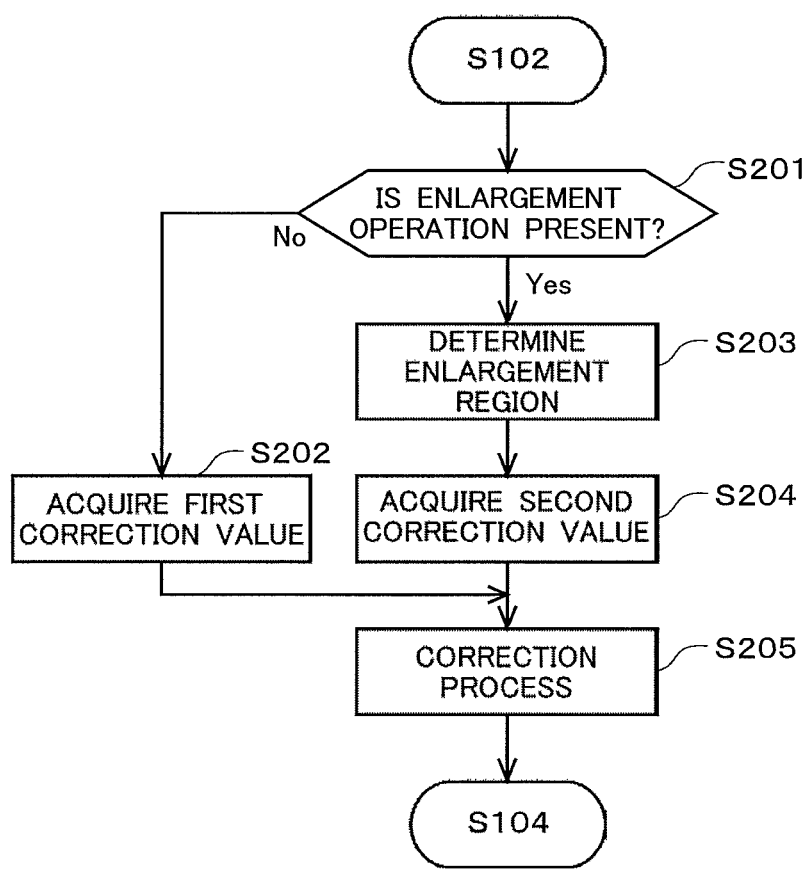
FIG. 6 illustrates a second correction process.

With reference to FIG. 6, the second correction process is described in detail. FIG. 6 is a flowchart of the second correction process. The second corrector 22c determines presence or absence of an enlargement operation made by the user (a step S201). This is a determination about presence or absence of a command (input) indicative of enlarging a portion of the captured image to display the captured image. In this embodiment, the second correction process differs depending on whether or not a portion of the captured image is enlarged before displaying the captured image. Therefore, presence or absence of the enlargement operation is determined. Presence or absence of the enlargement operation may be determined by determining a content of an operation input, for example, by touching a portion of the display that is desired to be enlarged.

In a case of absence of the enlargement operation, i.e., in a case of absence of an input of the command indicative of enlarging a portion (No in the step S201), the second corrector 22c acquires the first correction value from the memory 24 (a step S202). Since the enlargement process based on a user command is not performed, the first correction value is used. The first correction value includes a first angle and a second angle. In this embodiment, as described later, when a new projection plane is generated, the upper portion of the projection plane is lifted and the angle of the projection plane is gradually reduced for lower portions of the projection plane. Therefore, the first correction value includes the first angle that is used to lift the upper portion of the projection plane and the second angle that is used to gradually reduce the angle of the projection plane.

Figure 7:
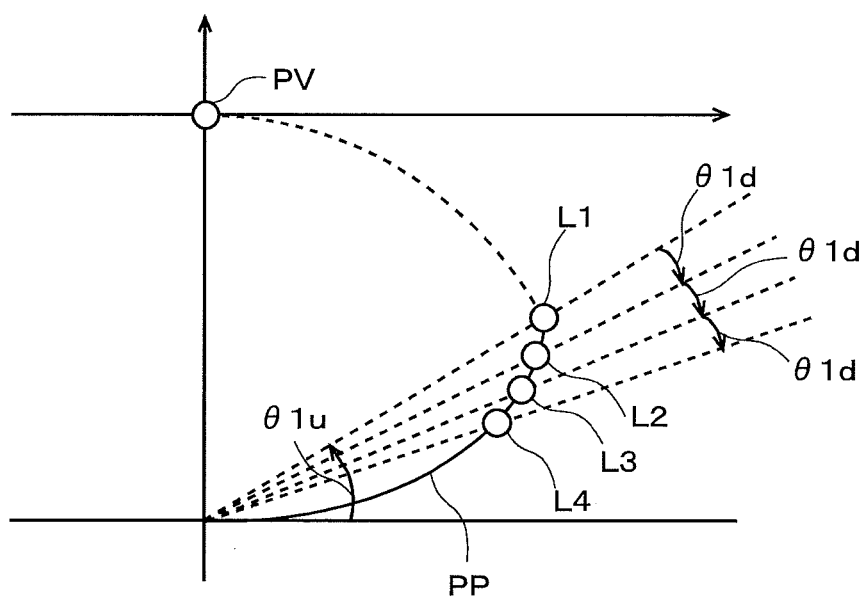
FIG. 7 illustrates an explanation of the second correction process.

The second corrector 22c performs the second correction process (a step S205). The second correction process is also a process of generating the new projection plane. Therefore, a generation method of the new projection plane is described with reference to FIG. 7. FIG. 7 illustrates a side view of the new projection plane.

The image data is arranged in a matrix on the projection plane that is the road surface on which image data is projected. The second corrector 22c selects image data L1 of a row corresponding to a most upper portion of the screen, from amongst the image data arranged onto a projection plane PP. In other words, the second corrector 22c selects the image data L1 laterally disposed furthest away from the host vehicle (or a virtual viewpoint PV).

The second corrector 22c acquires a first angle θ1u and a second angle θ1d as the first correction value. The second corrector 22c places the selected image data L1 to a portion lifted at the first angle θ1u, of the projection plane. In other words, the image data L1 is projected onto the portion lifted at the first angle θ1u, of the projection plane.

Next, the second corrector 22c selects image data L2 corresponding to a second upper row of the screen from the image data disposed on the projection plane PP. In other words, the second corrector 22c selects the image data L2 laterally disposed one row below the image data L1. The second corrector 22c places the selected image data L2 to a portion lower than the first angle θ1u by the second angle θ1d, of the projection plane. In other words, the second corrector 22c projects the image data L2 onto the portion lifted at an angle (θ1u-θ1d), of the projection plane.

Similarly, the second corrector 22c selects image data L3 corresponding to a third upper row of the screen from the image data disposed on the projection plane PP. In other words, the second corrector 22c selects the image data L3 laterally disposed one row below the image data L2. The second corrector 22c places the selected image data L3 to a portion lower than an angle (θ1u-θ1d) by the second angle θ1d, of the projection plane. In other words, the second corrector 22c projects the image data L3 onto the portion lifted at an angle (θ1u-2×θ1d), of the projection plane.

In the second correction process, the projection plane is generated by selecting the image data in order from a most upper portion of the screen and by lifting the image data at the first angle and then reducing the angle by the second angle. In this process, there may be a case where a sum of the second angles exceeds the first angle. That means that an angle at which the projection plane is lifted becomes zero degree. Therefore, in the case where the second angles exceeds the first angle, the second corrector 22c projects the image data onto the road surface without lifting the image data for a lower portion of the screen after that.

In other words, it is possible to gradually change the projection plane from a bent plane to a flat plane by first lifting the image data disposed to the upper portion of the projection plane and then by subtracting a predetermined angle from the lifted angle every time when the image data is selected to be disposed to a portion lower than the upper portion. Thus, a portion of the new projection plane corresponding to the lower portion of the screen is flat but a portion of the new projection plane corresponding to the upper portion of the screen is bent. In other words, a new bent projection plane is generated. In a case where the angle for lifting the projection plane is zero degree, the image data for the flat portion of the projection plane may be freshly projected or original projection plane may be used because the angle of zero degree practically means projection on the road surface.

The first angle θ1u and the second angle θ1d are arbitrary angles predetermined beforehand. The appearance of the image can be improved by the correction that suppresses deformation of an image caused by longitudinal extension. However, an area that is not displayed (hereinafter referred to as "undisplayed area") becomes greater by the correction that suppresses deformation of an image caused by longitudinal extension. Therefore, it is recommended that the first angle θ1u and the second angle θ1d should be determined in consideration of balance between improvement in appearance by the correction and a displayed area. For example, the first angle θ1u is set to 20 degrees and the second angle θ1d is set to four degrees.

Figure 8A:
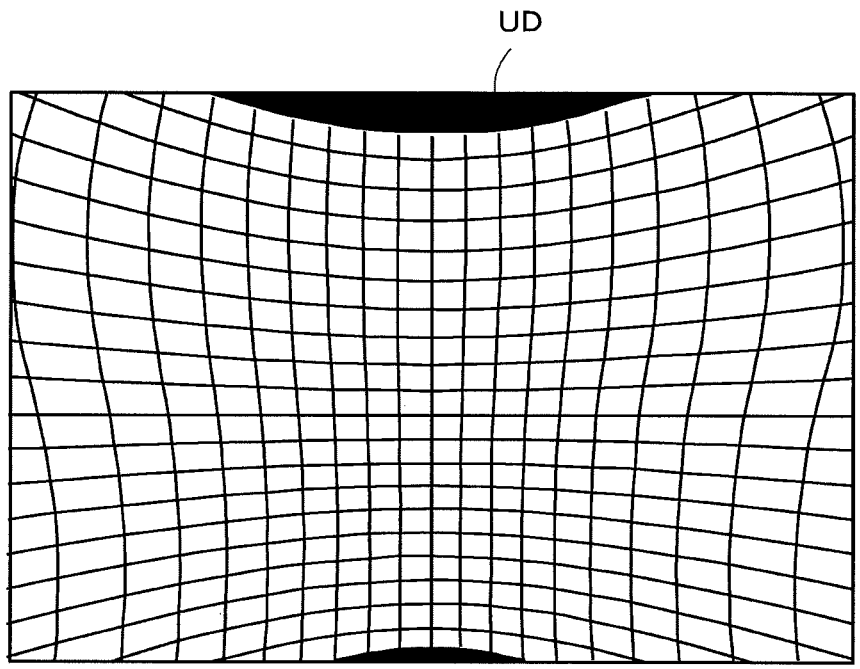
FIG. 8A is an image drawing of a projection plane.
Figure 8B:
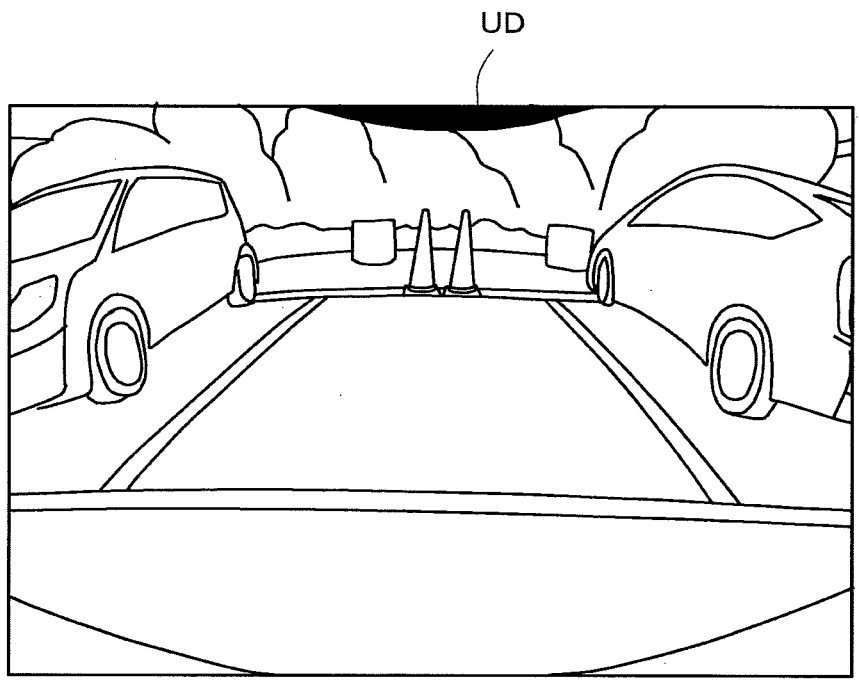
FIG. 8B illustrates an example of a displayed image.

The second correction process that is performed in the case of absence of the enlargement operation is described with reference to FIG. 8A and FIG. 8B. FIG. 8A is an image drawing showing a projection plane generated through the second correction process. A crosshatch pattern is used for FIG. 8A for easy understanding of the correction. As shown in FIG. 8A, the projection plane in FIG. 8 is corrected such that the image on the upper portion (distant from the camera 1) of the projection plane is displayed closer to a center of the screen than the image projected on the projection plane in FIG. 4A. When being projected on such a projection plane, the objects on an upper portion of the image are displayed closer to the center of the screen. Therefore, the objects are displayed with less deformation caused by longitudinal extension. FIG. 8B illustrates an example of a captured image displayed after this second correction process.

Here, the image in FIG. 4B is compared with the image in FIG. 8B. FIG. 4B is a displayed image of which distortion is corrected after being projected onto the road surface. As shown in FIG. 4B, objects in a distant area displayed on the upper portion of the screen are longitudinally extended. On the other hand, FIG. 8B is a displayed image of which deformation caused by longitudinal extension is correction. As shown in FIG. 8B, due to the second correction process, the objects in a distant area displayed on the screen are displayed, having less longitudinal extension.

As described above, it is possible to suppress the deformation of the captured image caused by the longitudinal extension of the objects in a distant area by the correction that lifts the upper portion of the projection plane projected onto the road surface. On the other hand, since the upper portion of the screen is displayed closer to the center of the screen, an area that is not displayed on the upper portion of the screen (undisplayed area) occurs (an area UD in FIG. 8A and FIG. 8B).

Therefore, the image display system 10 displays an area other than the undisplayed area of the captured image. Here, with reference back to FIG. 2, the image processor 22 performs the enlargement process (a step S104). In this enlargement process, the area to be displayed is enlarged. In the case of absence of the user operation indicative of enlarging a portion of the captured image, the area other than the undisplayed area is extracted and enlarged in the enlargement process.

Figure 9A:
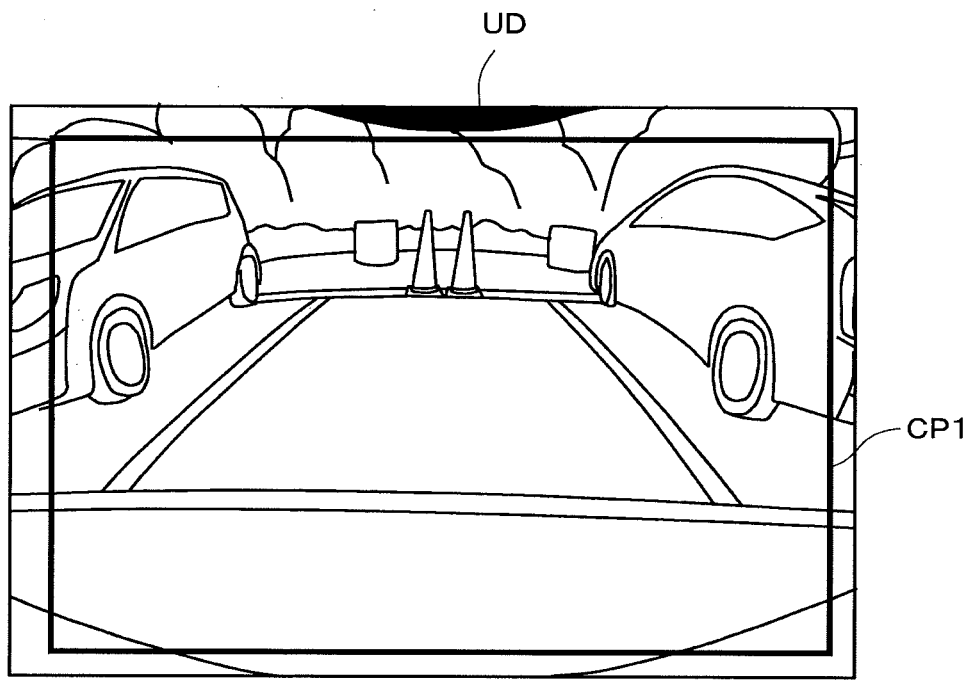
FIG. 9A illustrates a display range.
Figure 9B:
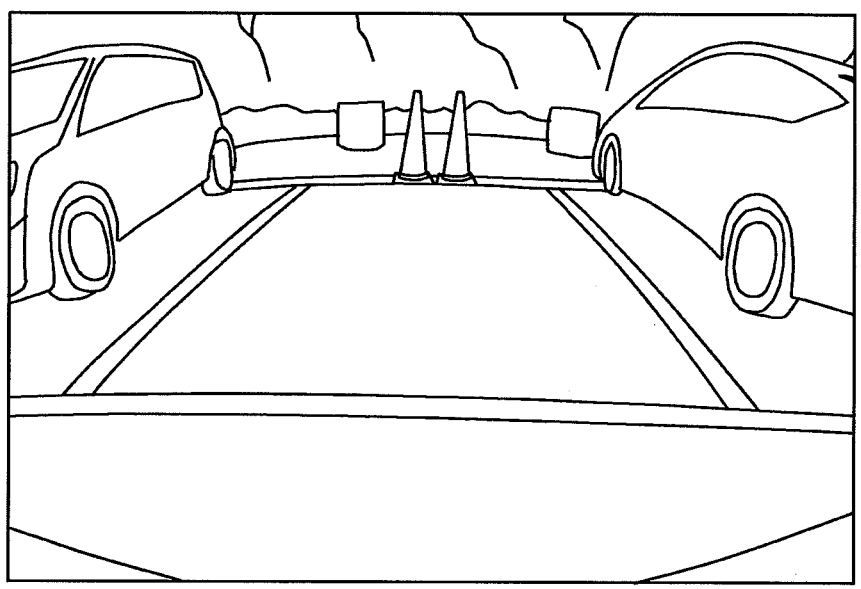
FIG. 9B illustrates and example of a displayed image.

Concretely, as shown in FIG. 9A, the enlarging part 22*d* selects a substantially maximum area CP1 other than the undisplayed area UD. Then, the enlarging part 22*d*, as shown in FIG. 9B, extracts image data of the area CP1 and enlarges the extracted image data so as to fit a size of the screen of the display 3. Then, the enlarged image data is output to the display 3 from the image outputting part 23, and the display 3 displays an image of the received image data on the display 3 (a step S105).

With reference back to FIG. 6, in the case of presence of the enlargement operation, i.e., in a case of presence of an input of the command indicative of enlarging a portion (Yes in the step S201), the second corrector 22*c* determines an enlargement region (a step S203). This is a process of determining a region to be enlarged (enlargement region) in a case of presence of an input of the command indicative of enlarging and displaying a portion of the captured image. In a case where the user specifies the enlargement region by a touch operation on the screen, the region is determined by acquiring coordinate information of a position specified by the touch operation.

Once the enlargement region is determined, the second corrector 22*c* acquires the second correction value from the memory 24 (a step S204). This process is performed in a case of presence of the enlargement process that is performed based on the user command so that the second correction value is used in this process. The second correction value also includes a first angle and a second angle. Being similar to the first angle and the second angle of the first correction value, the first angle is used to lift an upper portion of the projection plane and the second angle is used to gradually reduce the angle of the projection plane.

Moreover, in the second correction process performed in the case of presence of an input of the command indicative of enlarging and displaying a portion of the captured image in, the image data is corrected by use of a substantially maximum correction amount as long as the undisplayed area does not cross over the enragement region (without an overlap). Therefore, the second correction value varies depending on a position of the region specified by the command indicative of enlarging a portion and each second correction value corresponds to the position of the enlargement region. Therefore, the memory 24 stores, as the second correction value, for example, a data table and the like that includes coordinate information of positions of the enlargement regions associated with correction values that are combinations of the first angle and the second angle.

Then, the second corrector 22*c* performs the correction process (a step S205). In this process, too, the second corrector 22*c* generates a new projection plane, using the projection plane projected on the road surface (FIG. 4A). A method of generating the new projection plane is substantially the same as the method that is used in the case of absence of the enlargement operation made by the user, except the correction value (the first angle and the second angle). This process (in the second correction process performed in the case of presence of the enlargement operation made by the user) uses a greater correction amount than the correction amount that is used in the case of absence of the enlargement operation made by the user.

Concretely, the process is performed as described below. The process is described, taking as an example a case where the second corrector 22*c* determines the enlargement region and acquires a first angle $\theta 2u$ and a second angle $\theta 2d$ as the second correction value associated with the enlargement region. In this case, the second corrector 22*c* selects the image data L1 of the projection plane and places the selected image data L1 to a portion lifted at the first angle $\theta 2u$. In other words, the second corrector 22*c* lifts the projection plane such that the image data L1 is placed to a portion of the projection plane at the first angle $\theta 2u$. Thus, the image data L1 is projected onto the portion of the projection plane lifted at the first angle $\theta 2u$.

Next, the second corrector 22*c* selects the image data L2 and places the selected image data L2 such that the image data L2 is placed lower than the first angle $\theta 2u$ by the second angle $\theta 2d$. In other words, the second corrector 22*c* lifts the projection plane such that the image data L2 is placed to the position at an angle $(\theta 2u - \theta 2d)$. Thus, the image data L2 is projected onto the position of the projection plane lifted at the angle $(\theta 2u - \theta 2d)$.

Similarly, the second corrector 22*c* selects and places image data L3 such that the image data L3 is lower than the angle $(\theta 2u - \theta 2d)$ by the second angle $\theta 2d$. In other words, the second corrector 22*c* lifts the projection plane such that the image data L3 is placed at an angle $(\theta 2u - 2 \times \theta 2d)$. Thus, the image data L3 is projected onto a portion lifted at the angle $(\theta 2u - 2 \times \theta 2d)$, of the projection plane. Then, the process is continued in a same manner as the second correction process performed in the case of absence of the enlargement operation made by the user.

Figure 10:
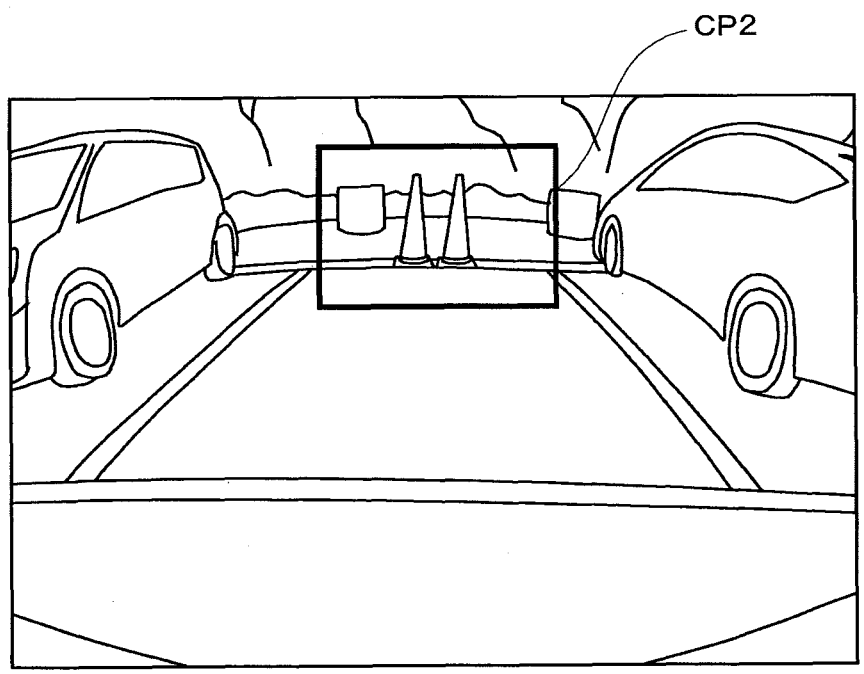
FIG. 10 illustrates an enlargement region.
Figure 11A:
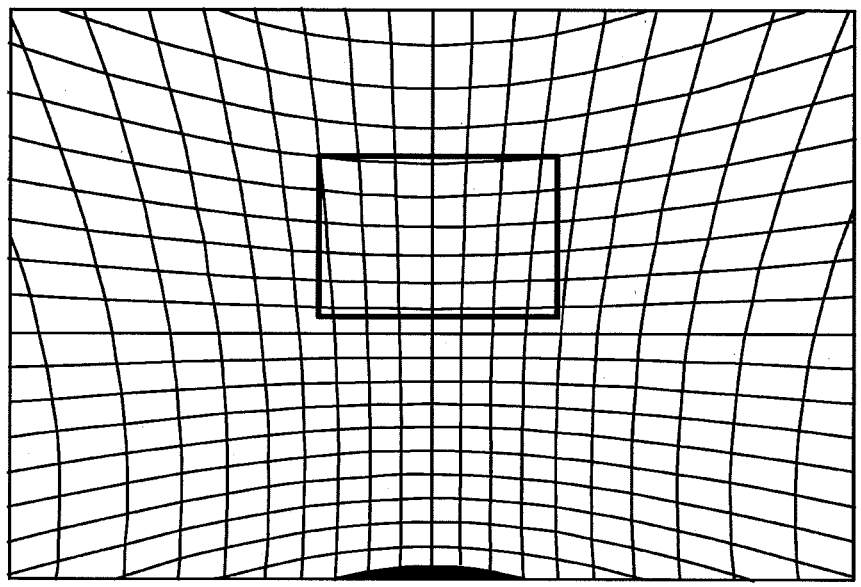
FIG. 11A illustrates an image drawing of a projection plane.
Figure 11B:
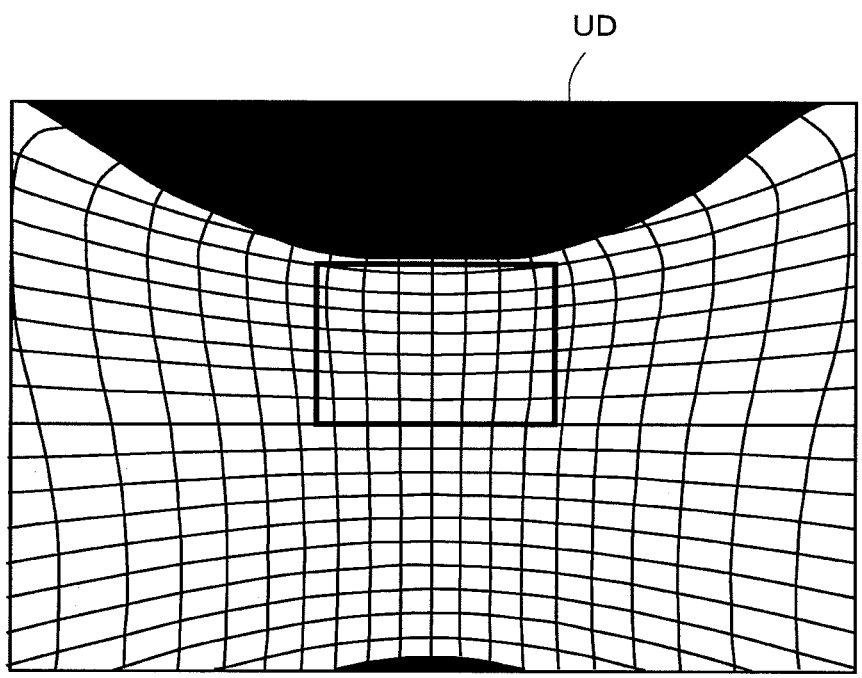
FIG. 11B illustrates an image drawing of a projection plane.

The second correction process performed in the case of presence of the enlargement operation made by the user is described with reference to a drawing. FIG. 10 illustrates an enlargement region in a captured image. FIG. 11A and FIG. 11B are image drawings of the projection plane that is used in the case of presence of the enlargement operation in the second correction process. A crosshatch patterns are also used for FIG. 11A and FIG. 11B for easy understanding of correction.

FIG. 10 illustrates an enlargement region CP2 specified by the enlargement operation made by the user. FIG. 11A is an image drawing of a portion of the projection plane corresponding to the enlargement region CP2. In other words, FIG. 11A illustrates an area subject to the enlargement process, of the projection plane projected onto the road surface. FIG. 11B is an image drawing of a new projection plane generated through the second correction process of the projection plane.

As shown in FIG. 11B, the projection plane is bent such that the undisplayed area is expanded close to a boundary of the area subject to the enlargement process. As a result, deformation caused by the longitudinal extension is suppressed greater. The undisplayed area becomes greater by the correction that suppresses more deformation caused by the longitudinal extension. However, since the projection plane is bent as long as the undisplayed area does not cross over the enragement area (without an overlap), the correction substantially maximally suppresses the deformation caused by the longitudinal extension.

With reference back to FIG. 2, the enlarging part 22*d* performs the enlargement process, using the image data corrected by the second correction process (the step S104). Concretely, the enlarging part 22*d* extracts an area subject to the enlargement process, from the image data corrected by the second correction process, and enlarges the area to the size of a displayed area of the display 3.

Figure 12:
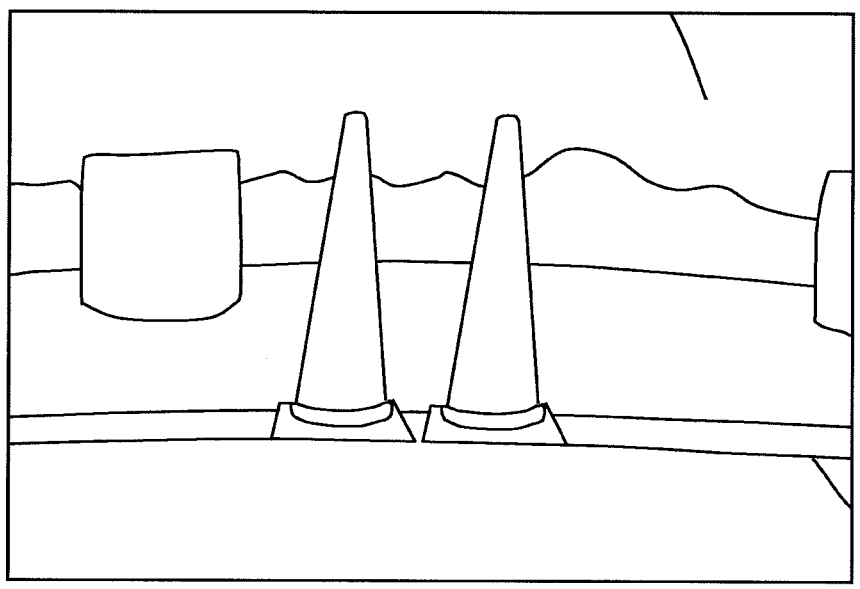
FIG. 12 illustrates a displayed image.

Next, the display 3 performs a display process (the step S105). The image data enlarged by the enlarging part 22d is output from the image outputting part 23 to the display 3. As shown in FIG. 12, the display 3 displays the image enlarged based on the acquired image data.

As described above, by use of the new projection plane, projected on the road surface, generated by lifting the upper portion of the projection plane corresponding to the upper portion of the screen, it is possible to suppress the deformation caused by the longitudinal extension of the 3D objects existing distant from a virtual viewpoint (host vehicle). When a part of the image is enlarged and then displayed, the new projection plane is generated such that the undisplayed area caused by lifting the projection plane is substantially greatest as long as the undisplayed area does not cross over the enragement area. Thus, the deformation caused by the longitudinal extension can be suppressed more and deterioration of quality of the displayed enlargement image can be avoided. The foregoing embodiment describes an example of changing the correction amount for the deformation of an image by a degree for lifting the projection plane. However, a method of correction of deformation of an image is not limited to the embodiment.

In the foregoing embodiment, the various functions are implemented by software by the CPU performing the calculation process in accordance with the program. However, a part of those functions may be implemented by an electric hardware circuit. Contrarily, in the foregoing embodiment, a part of functions that are implemented by a hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that processes an image, the image processing apparatus comprising:
   an image processor configured to:
   receive a captured image from an image acquisition part that acquires the captured image from a camera that captures an image of a vicinity of a vehicle;
   project data of the captured image onto a virtual projection plane provided in the vicinity of the vehicle; and
   correct deformation of the captured image caused by projection of the captured image onto the virtual projection plane, wherein:
   in a case of presence of input of a command indicative of enlarging a portion of the captured image, the image processor corrects the deformation of the captured image by using a greater correction amount than a correction amount that is used in a case of absence of the input of the command indicative of enlarging the portion of the captured image,
   the image processor corrects the deformation of the captured image by use of a correction amount as long as an undisplayed area does not overlap an enlargement region that is enlarged by the input of the command indicative of enlarging the portion of the captured image, the undisplayed area being caused by correction of the deformation, and
   the correction of the deformation is such that a greater correction amount is used for image data to be displayed on an upper portion of a screen, among the image data projected onto a surface of a road.

2. The image processing apparatus according to claim 1, wherein
   the image processor corrects the deformation of the captured image by bending a portion of the virtual projection plane toward the vehicle, the portion being distant from the image of the vehicle on the virtual projection plane.

3. An image display system that displays an image, the image display system comprising:
   the image processing apparatus according to claim 1; and
   a display that displays an image output from the image processing apparatus.

4. An image processing method that processes an image, the image processing method comprising the steps of:
   (a) receiving, by an image processor, a captured image from a camera that captures an image of a vicinity of a vehicle;
   (b) projecting, by the image processor, data of the captured image onto a virtual projection plane provided in the vicinity of the vehicle; and
   (c) correcting, by the image processor, deformation of the captured image caused by the projecting of the captured image onto the virtual projection plane, wherein:
   in a case of presence of input of a command indicative of enlarging a portion of the captured image, the step (c) uses a greater correction amount than a correction amount that is used in a case of absence of the input of the command indicative of enlarging the portion of the captured image,
   the step (c) corrects the deformation of the captured image by use of a correction amount as long as an undisplayed area does not overlap an enlargement region that is enlarged by the input of the command indicative of enlarging the portion of the captured image, the undisplayed area being caused by correction of the deformation, and
   the correction of the deformation is such that a greater correction amount is used for image data to be displayed on an upper portion of a screen, among the image data projected onto a surface of a road.

5. The image processing method according to claim 4, wherein
   the step (c) bends a portion of the virtual projection plane toward an image of the vehicle, the portion being distant from the image of the vehicle on the virtual projection plane.

* * * * *